(12) United States Patent
Yoshizawa

(10) Patent No.: US 7,868,288 B2
(45) Date of Patent: Jan. 11, 2011

(54) OPTICAL SCANNING DEVICE, IMAGE FORMING APPARATUS INCLUDING THE SAME, AND METHOD OF CONFIGURING THE SAME

(75) Inventor: Hiroshi Yoshizawa, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 667 days.

(21) Appl. No.: 11/802,486

(22) Filed: May 23, 2007

(65) Prior Publication Data
US 2007/0273947 A1 Nov. 29, 2007

(30) Foreign Application Priority Data
May 24, 2006 (JP) ............... 2006-144116
Apr. 18, 2007 (JP) ............... 2007-109171

(51) Int. Cl.
*G02B 26/08* (2006.01)
(52) U.S. Cl. ............ 250/239; 250/234; 348/203; 359/218.1
(58) Field of Classification Search ......... 250/239, 250/234; 348/203; 359/218.1
See application file for complete search history.

(56) References Cited

U.S. PATENT DOCUMENTS

| | | | | |
|---|---|---|---|---|
| 4,796,963 A | * | 1/1989 | Yoshimura | ......... 348/203 |
| 4,877,955 A | * | 10/1989 | Ono | ......... 250/239 |
| 2002/0036683 A1 | | 3/2002 | Yokoyama et al. | |
| 2003/0058513 A1 | | 3/2003 | Yoshizawa | |
| 2006/0209376 A1 | | 9/2006 | Yamakawa et al. | |
| 2007/0046766 A1 | | 3/2007 | Ono et al. | |

FOREIGN PATENT DOCUMENTS

| | | |
|---|---|---|
| JP | 11-038344 | 2/1999 |
| JP | 11-287966 | 10/1999 |
| JP | 2000-339273 | 12/2000 |
| JP | 2001-010013 | 1/2001 |
| JP | 2001-235699 | 8/2001 |
| JP | 2002-182145 | 6/2002 |
| JP | 2004-279632 | 10/2004 |
| JP | 2005-036394 | 2/2005 |
| JP | 2005-202923 | 7/2005 |

* cited by examiner

*Primary Examiner*—Seung C Sohn
(74) *Attorney, Agent, or Firm*—Harness, Dickey & Pierce, P.L.C.

(57) ABSTRACT

An enclosure includes a first enclosure and a second enclosure. A deflector deflects a light emitted from a light source. A first optical system leads the light emitted from the light source to the deflector. A second optical system includes at least one optical element, and leads the light deflected by the deflector onto a surface to be scanned. The first enclosure holds the light source, the deflector, and the first optical system, and the second enclosure holds the at least one optical element included in the second optical system.

18 Claims, 9 Drawing Sheets

OPTICAL SCANNING DEVICE, IMAGE FORMING APPARATUS INCLUDING THE SAME, AND METHOD OF CONFIGURING THE SAME

CROSS-REFERENCE TO RELATED APPLICATIONS

The present document incorporates by reference the entire contents of Japanese priority documents, 2006-144116 filed in Japan on May 24, 2006, and 2007-109171 filed in Japan on Apr. 18, 2007.

BACKGROUND OF THE INVENTION

1. Field of the Invention

The present invention relates to an optical scanning device and an image forming apparatus equipped with the optical scanning device, such as a digital copying machine and a laser printer.

2. Description of the Related Art

Various types of optical scanning devices for scanning a surface of an object to be scanned, such as a photoreceptor, have been developed and put into practical use. Of these optical scanning devices, those included in image forming apparatuses, such as a laser printer, have different configurations in most cases, even if the optical scanning devices are produced by the same manufacturer. This is because layouts of the image forming apparatuses equipped with the optical scanning devices are different from one another.

For example, in a digital copying machine shown in FIG. 16A, a paper feeding unit 201, a scanner 202, and an imaging engine unit 203 are respectively arranged at the bottom, the top, and the center of the digital copying machine, and a copy receiving tray 206 to which paper is discharged is located on one of the sides of the digital copying machine. In this layout, it is necessary to convey paper fed from the paper feeding unit 201 to a transfer unit that is located below a photosensitive drum 204. Therefore, an optical scanning device 205 is inevitably arranged above the photosensitive drum 204 in terms of a process configuration and procedures of electrophotographic processing. The digital copying machine contains the optical scanning device 205, so that an overall width of the digital copying machine needs to be larger than the same for the optical scanning device 205 (with minimizing the overall width of the digital copying machine as much as possible). Consequently, the optical scanning device 205 needs to include a reflection mirror for reflecting a scanning beam to shorten the overall width of the optical scanning device 205.

In a laser printer shown in FIG. 16B, a paper feeding unit 301 is arranged at the bottom of the laser printer, and an imaging engine unit 303 is arranged on top of the paper feeding unit 301. In this layout, a paper path is longitudinally arranged on one of the sides of the laser printer, and paper is conveyed through the paper path and discharged onto a copy receiving tray 306 that is located on the top of the laser printer. Therefore, an optical scanning device 305 is inevitably arranged on the (slightly downward) lateral side of a photosensitive drum 304 in terms of a process configuration and procedures of electrophotographic processing. Then, an interface device 307 is arranged adjacent to the optical scanning device 305, so that the optical scanning device 305 needs to include a reflection mirror for reflecting a scanning beam to minimize a size of the optical scanning device 305.

In a full-color printer shown in FIG. 16C, a paper feeding unit 401 is arranged at the bottom of the full-color printer, and an imaging engine unit 403 is arranged on top of the paper feeding unit 401. The imaging engine unit 403 includes a plurality (in this case, four) of photosensitive drums 404 and a plurality (in this case, four) of optical scanning devices 405 corresponding to each of the photosensitive drums 404 respectively. In this layout, a paper path is longitudinally arranged on one of the sides of the full-color printer, and paper is conveyed through the paper path and discharged onto a copy receiving tray 406 that is located on the top of the full-color printer. Therefore, the optical scanning devices 405 are inevitably arranged lateral to the photosensitive drums 404. In this case, the optical scanning devices 405 have no need to include a reflection mirror because there is no component adjacent to the optical scanning devices 405. If the optical scanning devices 405 respectively include a reflection mirror, an overall height of the full-color printer becomes disadvantageously too high. Consequently, any reflection mirror is not used in the optical scanning devices 405 to keep the overall height of the full-color printer in a user-friendly manner.

As described above, when different layouts of image forming apparatuses are produced, it is necessary to produce optical scanning devices having different configurations corresponding to each of the layouts of the image forming apparatuses.

However, although optical scanning devices have different configurations from one another, if the optical scanning devices have the same size of a scanning field (for example, in a case of an A4 paper, 297 mm in a longitudinal direction), the same scanning lens can be used among the optical scanning devices. Therefore, in optical scanning devices produced by the same manufacturer, the same scanning lens is used in common even among different models of optical scanning devices.

Incidentally, to achieve a desired imaging performance, relative positions (layouts) of a light source, a deflector, and a scanning lens in the different models of the optical scanning devices need to be identical with one another regardless of reflection angles of light beams.

In this manner, although some elements can be used in common among different models of optical scanning devices, various types of optical scanning devices are produced in accordance with various layouts of image forming apparatuses as described above, and thus it causes an increase of production costs. Moreover, from a viewpoint of the promotion of recycling, it is not preferable to produce various types of optical scanning devices because it is difficult to reuse the optical scanning devices.

SUMMARY OF THE INVENTION

It is an object of the present invention to at least partially solve the problems in the conventional technology.

An optical scanning device according to one aspect of the present invention includes an enclosure that includes a first enclosure and a second enclosure; a light source that emits a light; a deflector that deflects the light emitted from the light source; a first optical system that leads the light emitted from the light source to the deflector; and a second optical system that includes at least one optical element, and that leads the light deflected by the deflector onto a surface to be scanned. The first enclosure holds the light source, the deflector, and the first optical system, and the second enclosure holds the at least one optical element included in the second optical system.

An image forming apparatus according to another aspect of the present invention includes an optical scanning device that includes an enclosure that includes a first enclosure and a second enclosure, a light source that emits a light, a deflector that deflects the light emitted from the light source, a first optical system that leads the light emitted from the light source to the deflector, and a second optical system that includes at least one optical element, and that leads the light deflected by the deflector onto a surface to be scanned. The first enclosure holds the light source, the deflector, and the first optical system, and the second enclosure holds the at least one optical element included in the second optical system.

A method according to still another aspect of the present invention is for configuring an optical scanning device that includes an enclosure that includes a first enclosure and a second enclosure, a light source that emits a light, a deflector that deflects the light emitted from the light source, a first optical system that leads the light emitted from the light source to the deflector, and a plurality of second optical systems each including at least one optical element, having a different optical path, and leading the light deflected by the deflector onto a surface to be scanned. The method includes causing the first enclosure to hold the light source, the deflector, and the first optical system; causing a second enclosure to hold optical elements for the optical scanning device other than those held by the first enclosure; and combining selectively the first enclosure with a second enclosure from among the second enclosures.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Figure 1:
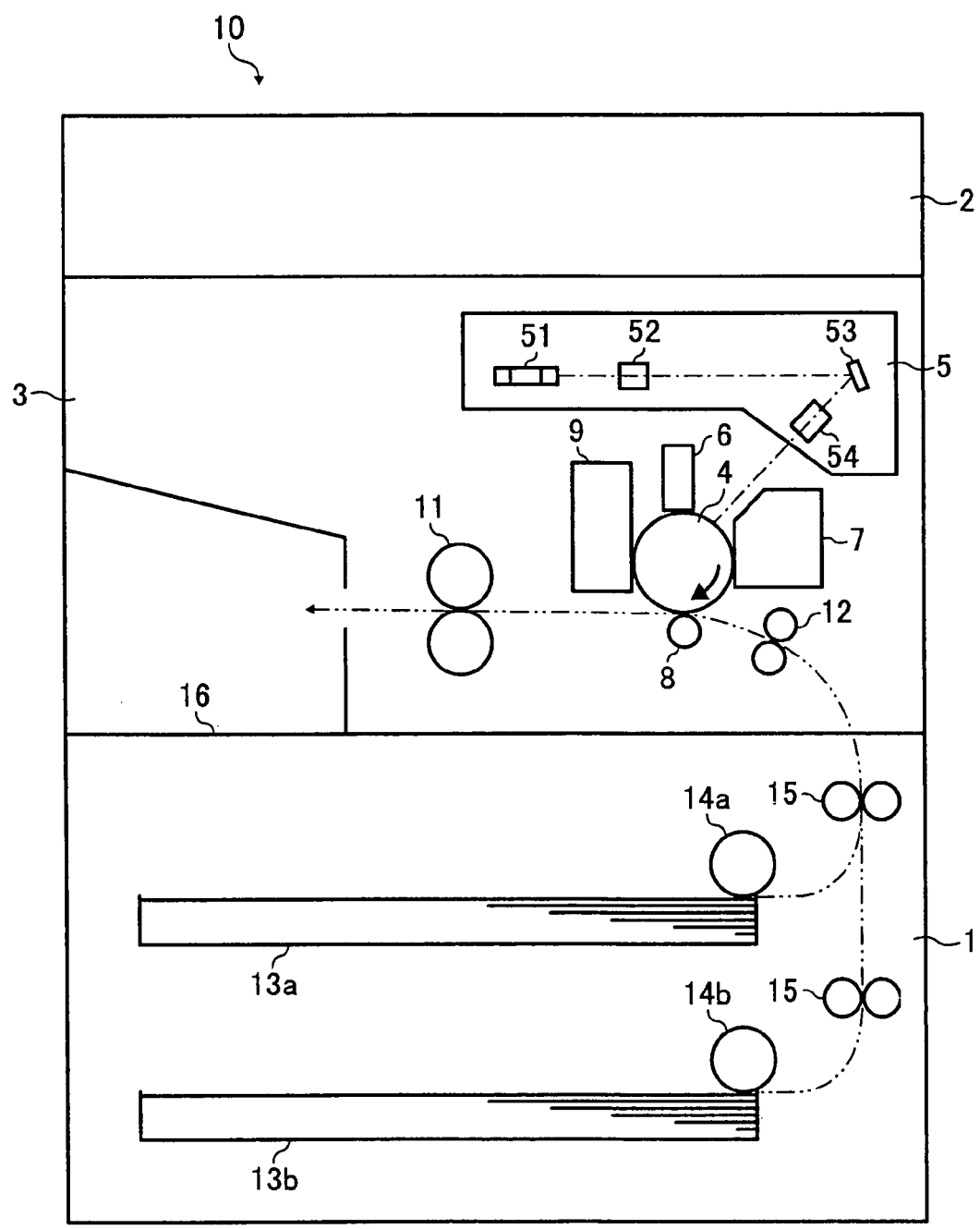
FIG. 1 is a side view of a digital copying machine as an example of an image forming apparatus equipped with an optical scanning device according a first embodiment of the present invention.

As an example of an image forming apparatus equipped with an optical scanning device, a digital copying machine 10 according a first embodiment of the present invention is explained in detail below with reference to FIG. 1. The digital copying machine 10 includes a paper feeding unit 1, a scanner 2, and an imaging engine unit 3. The paper feeding unit 1, the scanner 2, and the imaging engine unit 3 are respectively arranged at the bottom, the top, and the center of the digital copying machine 10.

The imaging engine unit 3 includes a photoconductive drum 4 as an image carrier, an optical scanning device 5, a charger 6, a developing device 7, a transfer roller 8, a cleaning device 9, a pair of fixing rollers 11, and a pair of paper stop rollers 12. The charger 6, the developing device 7, the transfer roller 8, and the cleaning device 9 are arranged around the photoconductive drum 4. The optical scanning device 5 is arranged above the photoconductive drum 4, the charger 6, the developing device 7, the transfer roller 8, and the cleaning device 9. The pair of fixing rollers 11 is arranged on the left side of the photoconductive drum 4.

The optical scanning device 5 includes a polygon scanner 51, an fθ lens 52, a reflection mirror 53, and a toroidal lens 54. In addition, the optical scanning device 5 further includes a light source unit 56 and a cylindrical lens 57 (see FIG. 3).

The paper feeding unit 1 includes paper feed trays 13a and 13b, paper feed rollers 14a and 14b, and two pairs of conveyance rollers 15. The paper feed rollers 14a and 14b are respectively provided on top of the paper feed trays 13a and 13b to feed paper to a paper path. The two pairs of conveyance rollers 15 are arranged on the paper path.

A surface of the photoconductive drum 4 is electrostatically charged at a predetermined electric potential uniformly by the charger 6. In the optical scanning device 5, a laser diode (LD) of the light source unit 56 is driven to emit a laser beam as a scanning light based on image data of a text that is scanned by the scanner 2. The laser beam emitted from the LD is irradiated onto a rotational polygon mirror included in the polygon scanner 51. Then, the laser beam is deflected by the rotational polygon mirror, and led to the photoconductive drum 4 via the fθ lens 52 and the like. As a result, an electrostatic latent image is formed on the photoconductive drum 4. The developing device 7 deposits toner particles on the electrostatic latent image, and thereby developing the electrostatic latent image into a toner image. In other words, the electrostatic latent image is visualized by the developing device 7.

On the other hand, paper fed from the paper feeding unit 1 is conveyed from the pair of paper stop rollers 12 to a transfer position, which is just between the photoconductive drum 4 and the transfer roller 8, to meet timing of the toner image. The toner image is transferred onto the paper at the transfer position, and the paper with the toner image is further conveyed towards the pair of fixing rollers 11. The toner image is fixed on the paper while the paper passes between the pair of fixing rollers 11. The paper with a copy image is discharged onto a copy receiving tray 16. To stand by for next copying, after the toner image is transferred onto the paper, the surface of the photoconductive drum 4 is cleaned by the cleaning device 9, and also a residual electric potential is removed from the surface of the photoconductive drum 4 by a neutralization device (not shown).

Figure 2:
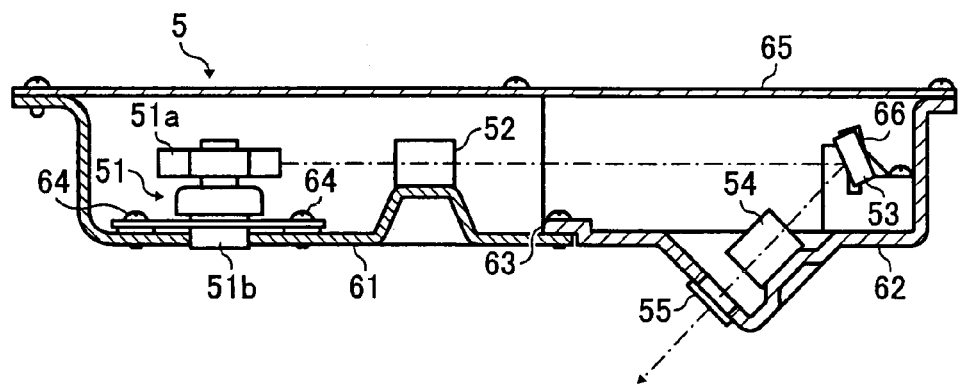
FIG. 2 is a side view of the optical scanning device shown in FIG. 1.

FIG. 2 is a side view of the optical scanning device 5.

Figure 3:
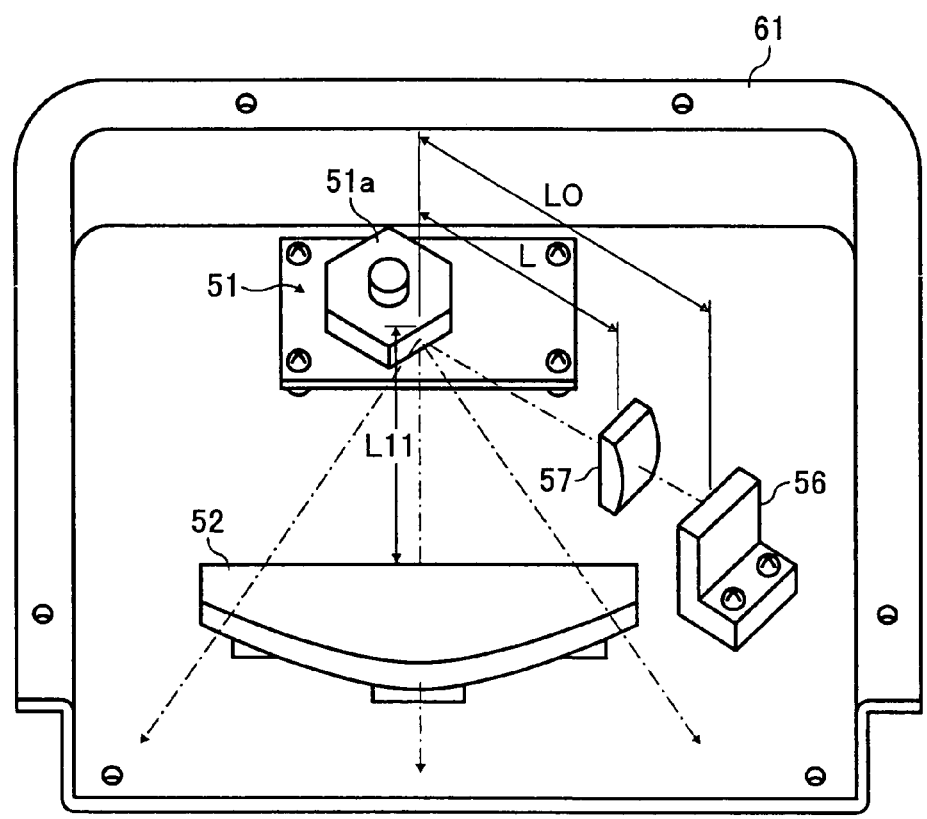
FIG. 3 is an overhead view of a first enclosure shown in FIG. 2.

The optical scanning device 5 includes the polygon scanner 51 as a rotational deflector, the fθ lens 52, the reflection mirror 53, the toroidal lens 54, a dust-proof glass 55, a first enclosure 61, a second enclosure 62, a screw 63, screws 64, a cover 65, and a leaf spring 66. In addition, as shown in FIG. 3, the optical scanning device 5 further includes the light source unit 56 and the cylindrical lens 57. The first enclosure 61 is combined with the second enclosure 62 by the screw 63, and thereby forming a frame of the optical scanning device 5. The first enclosure 61 is made of a steel sheet, and formed by press working. The second enclosure 62 is made of a resin material, and formed by injection molding. Alternatively, the first enclosure 61 and the second enclosure 62 can be formed by die-casting. An opening of the combined first and second enclosures 61 and 62 is covered with the cover 65 to protect against dust. The cover 65 is fixed to the first and second enclosures 61 and 62 by screws.

The polygon scanner 51 includes a rotational polygon mirror 51a and a bearing member 51b. The polygon scanner 51 is fixed to the first enclosure 61 by a plurality of the screws 64. Furthermore, the bearing member 51b is inserted into a hole provided on the first enclosure 61 to fix polygon scanner 51 thereto.

The fθ lens 52 is fixed to the first enclosure 61 by adhesion, and mainly used to focus an image in a main scanning direction. Then, the light source unit 56 and the cylindrical lens 57 are also fixed to the first enclosure 61 (see FIG. 3).

The reflection mirror 53, the toroidal lens 54, and the dust-proof glass 55 are held by the second enclosure 62. The toroidal lens 54 is mainly used to focus an image in a sub scanning direction. The toroidal lens 54 and the dust-proof glass 55 are fixed to the second enclosure 62 by adhesion. The reflection mirror 53 is held by a bias force of the leaf spring 66 included in the second enclosure 62.

FIG. 3 is an overhead view of the first enclosure 61. The light source unit 56 includes the LD and a coupling lens, and fixed to the first enclosure 61 by screws. The cylindrical lens 57 is fixed to the first enclosure 61 by adhesion. Incidentally, it is assumed that optical elements located upstream of the polygon scanner 51 are referred to as a first optical system, and optical elements located downstream of the polygon scanner 51 are referred to as a second optical system. The light source unit 56 and the cylindrical lens 57 belong to the first optical system.

A laser beam emitted from the light source unit 56 is irradiated onto the rotational polygon mirror 51a via the cylindrical lens 57. The laser beam is deflected by the rotational polygon mirror 51a, and irradiated onto the reflection mirror 53 via the fθ lens 52. The laser beam is reflected by the reflection mirror 53, and irradiated onto the photoconductive drum 4 via the toroidal lens 54. As a result, print data is written on the surface of the photoconductive drum 4.

Figure 4:
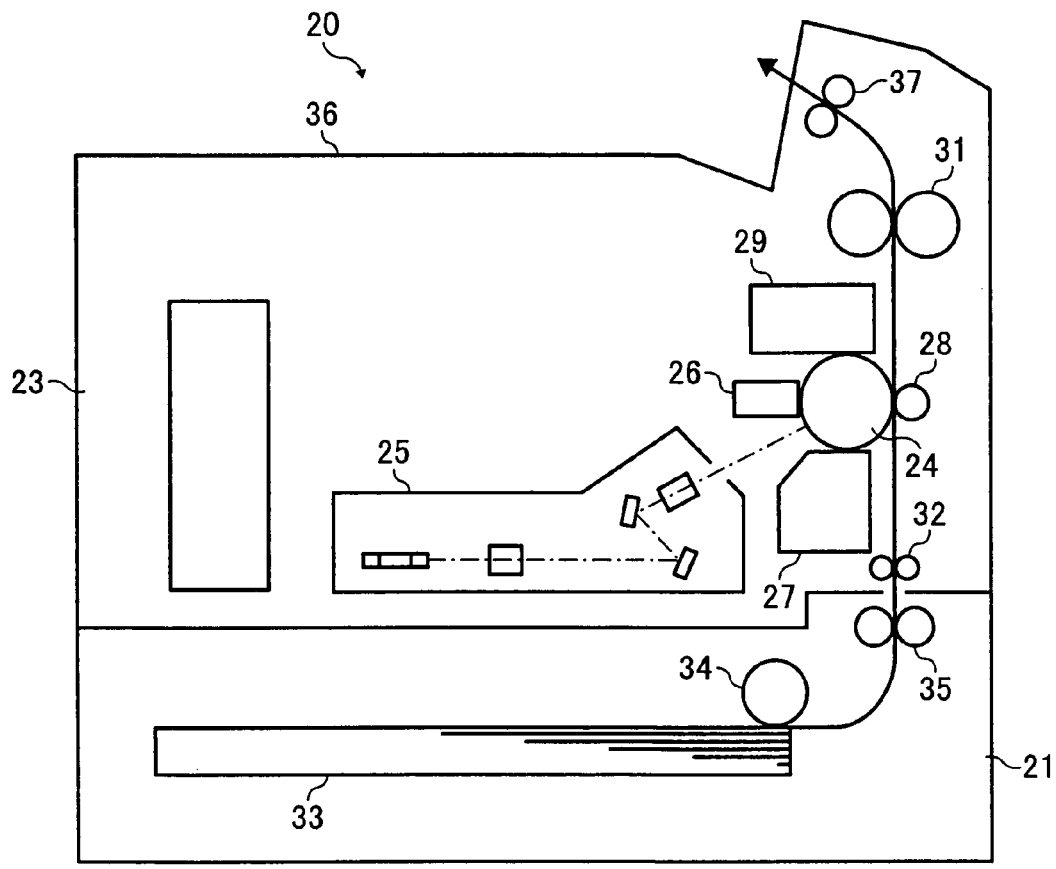
FIG. 4 is a side view of a laser printer as an example of an image forming apparatus equipped with an optical scanning device according a second embodiment of the present invention.

As another example of the image forming apparatus equipped with the optical scanning device, a laser printer 20 according a second embodiment of the present invention is explained in detail below with reference to FIG. 4. The laser printer 20 includes a paper feeding unit 21 and an imaging engine unit 23. The paper feeding unit 21 is arranged at the bottom of the laser printer 20, and the imaging engine unit 23 is arranged on top of the paper feeding unit 21.

The imaging engine unit 23 includes a photoconductive drum 24 as an image carrier, an optical scanning device 25, a charger 26, a developing device 27, a transfer roller 28, a cleaning device 29, a pair of fixing rollers 31, a pair of paper stop rollers 32, and a pair of paper discharging rollers 37. The charger 26, the developing device 27, the transfer roller 28, and the cleaning device 29 are arranged around the photoconductive drum 24. The optical scanning device 25 is arranged on the slightly downward lateral side of the photoconductive drum 24. The pair of fixing rollers 31 is arranged above the photoconductive drum 24.

The paper feeding unit 21 includes a paper feed tray 33, a paper feed roller 34, and a pair of conveyance rollers 35. The paper feed roller 34 is provided on top of the paper feed tray 33 to feed paper to a paper path. The pair of conveyance rollers 35 is arranged on the paper path.

The laser printer 20 does not include a scanner, and thus image data is transmitted from an external device such as a personal computer to the laser printer 20. An image forming process is basically identical to that is performed by the digital copying machine 10 according to the first embodiment, and thus the detailed description of the process is omitted, but briefly explained below. A toner image formed on the photoconductive drum 24 is transferred and fixed onto paper fed by the paper feeding unit 21, and the paper with the image is discharged onto a copy receiving tray 36 that is located on the top of the laser printer 20.

Figure 5:
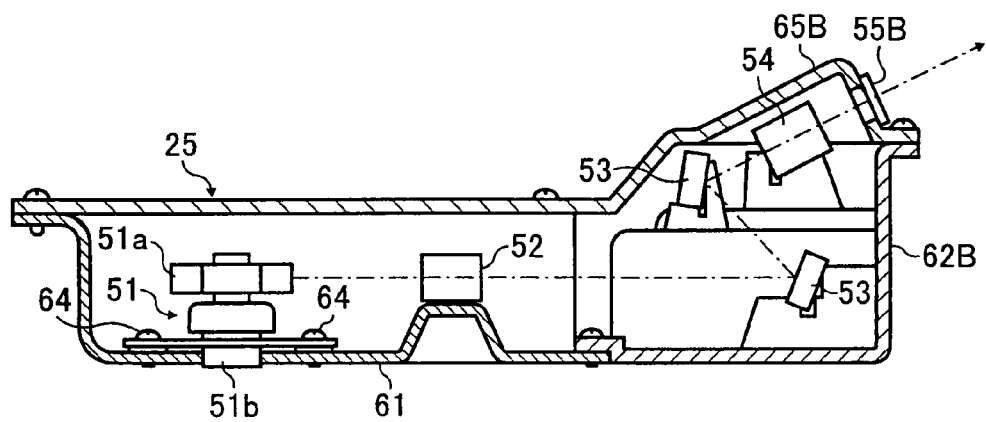
FIG. 5 is a side view of the optical scanning device shown in FIG. 4.

FIG. 5 is a side view of the optical scanning device 25. The portions identical to those in FIG. 2 for the first embodiment are denoted with the same reference numerals. Then, the portions similar to those in FIG. 2 for the first embodiment are denoted with the same reference numerals followed by "B".

For example, materials and layouts of the first enclosure 61, the polygon scanner 51, the fθ lens 52, and the first optical system (the light source unit 56 and the cylindrical lens 57), which are included in the optical scanning device 25, are the same as those in the optical scanning device 5. Therefore, the above elements can be used in common between the optical scanning device 5 and the optical scanning device 25.

A second enclosure 62B has a different shape from the second enclosure 62 because layouts of two numbers of the reflection mirrors 53 (hereinafter, referred to as the first and second reflection mirrors 53) and the toroidal lens 54 are different between the optical scanning device 5 and the optical scanning device 25. The first and second reflection mirrors 53, and the toroidal lens 54 are fixed to the second enclosure 62B in the optical scanning device 25.

The first enclosure 61 is combined with the second enclosure 62B by a screw and the like. An opening of the combined first and second enclosures 61 and 62B is covered with a cover 65B to protect against dust. The cover 65B is fixed to the first and second enclosures 61 and 62B by screws. The cover 65B includes an opening for emitting a scanning light. A dust-proof glass 55B is attached to the opening.

A laser beam emitted from the light source unit 56 is irradiated onto the rotational polygon mirror 51a via the cylindrical lens 57. The laser beam is deflected by the rotational polygon mirror 51a, and further irradiated onto the first reflection mirror 53 via the fθ lens 52. The laser beam is reflected by the first reflection mirror 53, and further reflected by the second reflection mirror 53, and then irradiated onto the photoconductive drum 4 via the toroidal lens 54. As a result, print data is written on the surface of the photoconductive drum 4.

Figure 6:
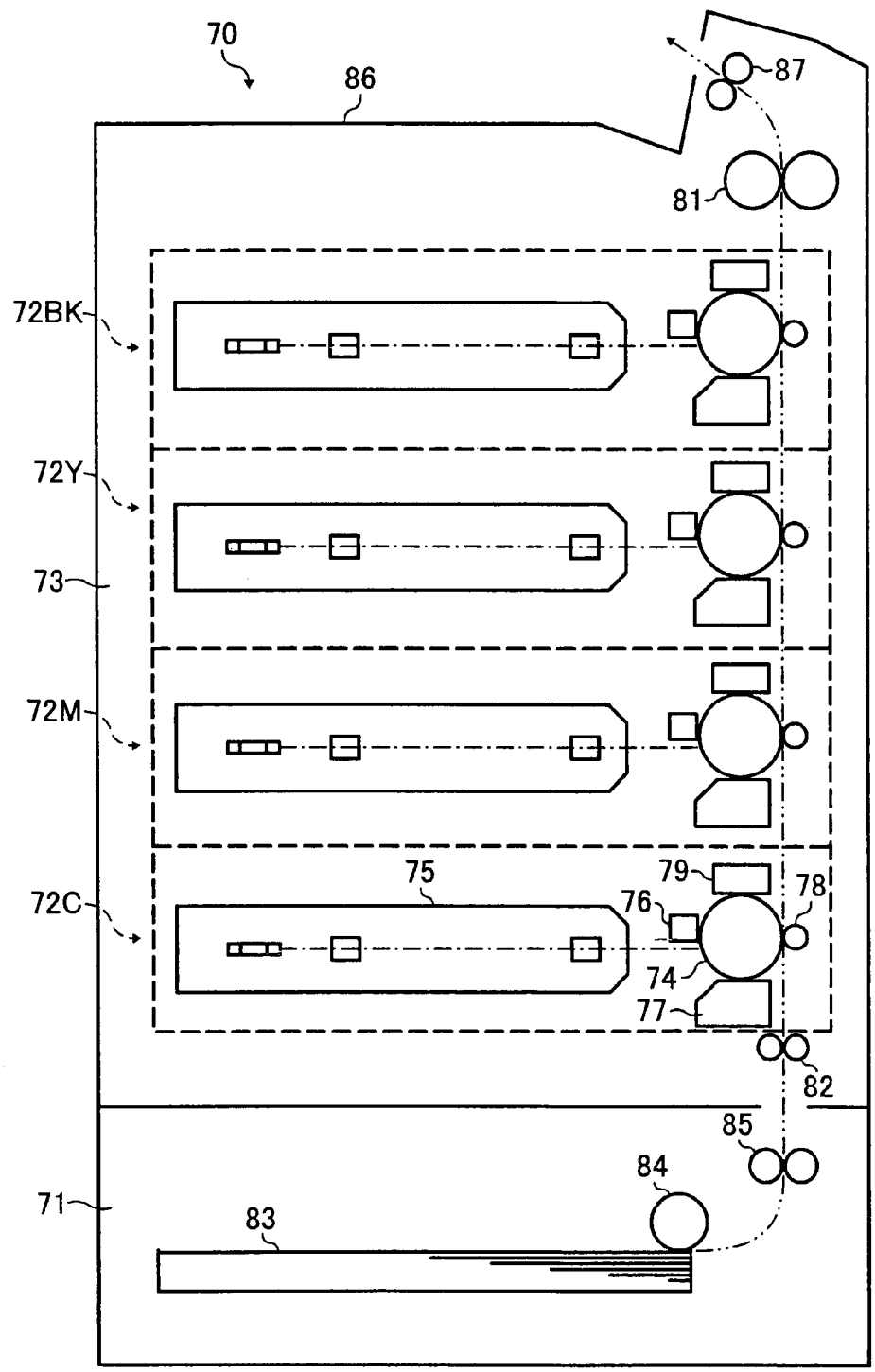
FIG. 6 is a side view of a color printer as an example of an image forming apparatus equipped with an optical scanning device according a third embodiment of the present invention.

As still another example of the image forming apparatus equipped with the optical scanning device, a color printer 70 according a third embodiment of the present invention is explained in detail below with reference to FIG. 6. The color printer 70 includes a paper feeding unit 71 and an imaging engine unit 73. The paper feeding unit 71 is arranged at the bottom and the top of the color printer 70, and the imaging engine unit 73 is arranged on top of the paper feeding unit 71.

The color printer 70 employs a four-drum tandem engine. The imaging engine unit 73 includes four imaging units 72C, 72M, 72Y, and 72Bk (for cyan (C), magenta (M), yellow (Y), and black (Bk) color respectively), a pair of fixing rollers 81, a pair of paper stop rollers 82, and a pair of paper discharging rollers 87.

The imaging units 72C, 72M, 72Y, and 72Bk are tandemly arranged in this order from the bottom. Each of the imaging units 72C, 72M, 72Y, and 72Bk has the same configuration except for a color of toner to be used therein. Reference numerals are not assigned to portions of the imaging units 72M, 72Y, and 72Bk, which are identical to those in the imaging unit 72C. The pair of fixing rollers 81 and the pair of paper discharging rollers 87 are arranged above the photoconductive drum included in the imaging unit 72Bk. The pair of paper stop rollers 82 is arranged below a photoconductive drum 74 included in the imaging unit 72C.

Each of the imaging units 72C, 72M, 72Y, and 72Bk includes the photoconductive drum 74 as an image carrier, an optical scanning device 75, a charger 76, a developing device 77, a transfer roller 78, and a cleaning device 79. The charger 76, the developing device 77, the transfer roller 78, and the cleaning device 79 are arranged around the photoconductive drum 74. The optical scanning device 75 is arranged on the lateral side of the photoconductive drum 74. In this case, each of the imaging units 72C, 72M, 72Y, and 72Bk includes a writing device, so that the optical scanning device 75 is arranged on the lateral side of the photoconductive drum 74. In the color printer 70, image data is separated by colors, and the imaging units 72C, 72M, 72Y, and 72Bk respectively emit a scanning light with a color component corresponding to each of the separated colors.

The paper feeding unit 71 includes a paper feed tray 83, a paper feed roller 84, and a pair of conveyance rollers 85. The paper feed roller 84 is provided on top of the paper feed tray 83 to feed paper to a paper path. The pair of conveyance rollers 85 is arranged on the paper path.

In the color printer 70, an image is formed with toners in cyan, magenta, yellow, and black colors in each of the imaging units 72C, 72M, 72Y, and 72Bk. When paper is fed from the paper feeding unit 71 to the imaging engine unit 73, the paper is conveyed from the pair of paper stop rollers 82 to each of the photoconductive drums 74 to meet timing of toner images to be formed thereon. The toner images are sequentially transferred onto the paper to be overlapped with one another by the transfer roller 78. As a result, a full-color image is formed on the paper. Incidentally, in a case of a monochrome image, only the imaging unit 72Bk is used to form a toner image in black, and the black toner image is transferred onto paper. The toner image is fixed onto the paper by the pair of fixing rollers 81, and the paper is discharged to a copy receiving tray 86 that is located on the top of the color printer 70 through the pair of paper discharging rollers 87 and stacked thereon.

Figure 7:
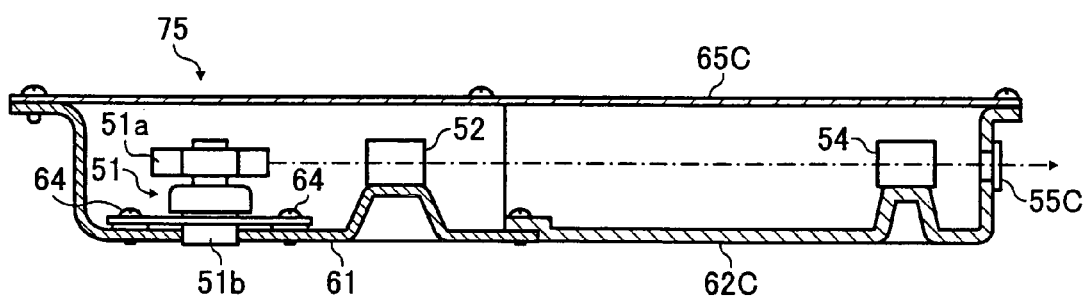
FIG. 7 is a side view of the optical scanning device shown in FIG. 6.

FIG. 7 is a side view of the optical scanning device 75. The portions identical to those in FIGS. 2 and 5 for the first and second embodiments are denoted with the same reference numerals. Then, the portions similar to those in FIGS. 2 and 5 for the first and second embodiments are denoted with the same reference numerals followed by "C".

For example, materials and layouts of the first enclosure 61, the polygon scanner 51, the fθ lens 52, and the first optical system (the light source unit 56 and the cylindrical lens 57), which are included in the optical scanning device 75, are the same as those in the optical scanning devices 5 and 25. Therefore, the above elements can be used in common among the optical scanning device 5, the optical scanning device 25, and the optical scanning device 75.

A second enclosure 62C, the second enclosure 62, and the second enclosure 62B respectively have a different shape because a layout of the toroidal lens 54 is different among the optical scanning device 5, the optical scanning device 25, and the optical scanning device 75. In the optical scanning device 75, the toroidal lens 54 is fixed to the second enclosure 62C by adhesion. Then, the rotational polygon mirror 51a, the fθ lens 52, and the toroidal lens 54 are linearly arranged, and thus the optical scanning device 75 has no need to include the reflection mirror 53.

The first enclosure 61 is combined with the second enclosure 62C by a screw and the like. An opening of the combined first and second enclosures 61 and 62C is covered with a cover 65C to protect against dust. The cover 65C is fixed to the first and second enclosures 61 and 62C by screws. The second enclosure 62C includes an opening for emitting a scanning light. A dust-proof glass 55C is attached to the opening. In this case, the second enclosure 62C is made of a resin material, and formed by injection molding. Alternatively, the second enclosure 62C can be made of a steel sheet, and formed by press working because the second enclosure 62C has a simple shape.

A laser beam emitted from the light source unit 56 is irradiated onto the rotational polygon mirror 51a via the cylindrical lens 57. The laser beam is deflected by the rotational polygon mirror 51a, and irradiated onto the photoconductive drum 4 via the fθ lens 52 and the toroidal lens 54. As a result, print data is written on the surface of the photoconductive drum 4. Incidentally, image data is separated by colors, and the imaging units 72C, 72M, 72Y, and 72Bk respectively emit a scanning light with a color component corresponding to each of the separated colors.

Figure 8:
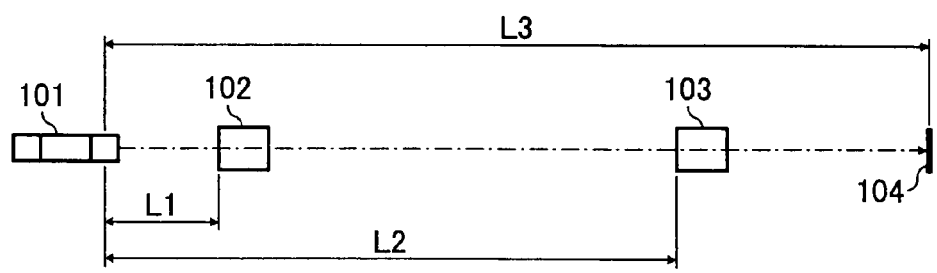
FIG. 8 is a schematic diagram for explaining a basic layout of an optical system in the optical scanning device.

Then, a basic layout of an optical system in an optical scanning device is explained below with reference to FIG. 8.

A laser beam emitted from a light source (not shown) is irradiated onto a polygon mirror 101 via a first optical system such as a cylindrical lens (not shown), and deflected in a main scanning direction by the polygon mirror 101. Then, the laser beam is irradiated onto a surface of an object to be scanned 104 via a first scanning lens 102 and a second scanning lens 103.

It is assumed that a distance between a reflection surface of the polygon mirror 101 and the first scanning lens 102 is referred to as a distance L1, and a distance between the reflection surface of the polygon mirror 101 and the second scanning lens 103 is referred to as a distance L2, and then a distance between the reflection surface of the polygon mirror 101 and the surface of the object 104 is referred to as a distance L3. In consideration for a focal length of each of the scanning lenses, each of the distances L1, L2, and L3 needs to be kept constant to achieve a desired imaging performance. For example, when the optical scanning device is used in a different image forming apparatus having a different configuration, if the distance L3 is changed due to the change of the configuration, it is not possible to achieve a desired imaging performance.

Figure 9A:
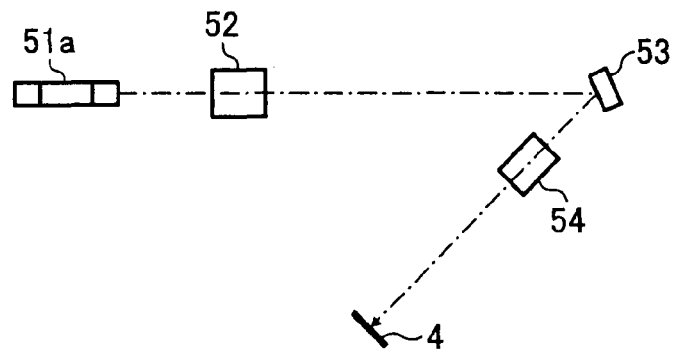
FIG. 9A is a simplified schematic diagram for explaining an optical path of the optical scanning device according the first embodiment.
Figure 9B:
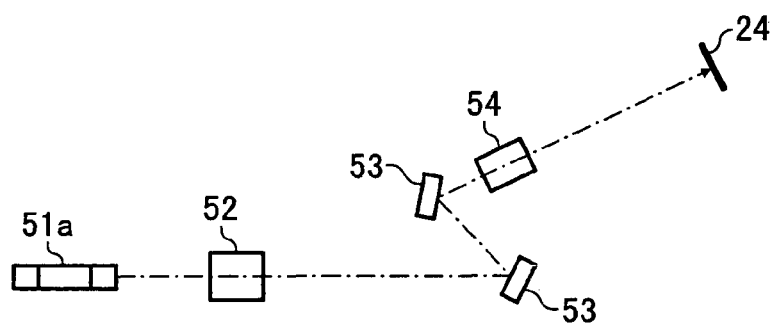
FIG. 9B is a simplified schematic diagram for explaining an optical path of the optical scanning device according the second embodiment.
Figure 9C:
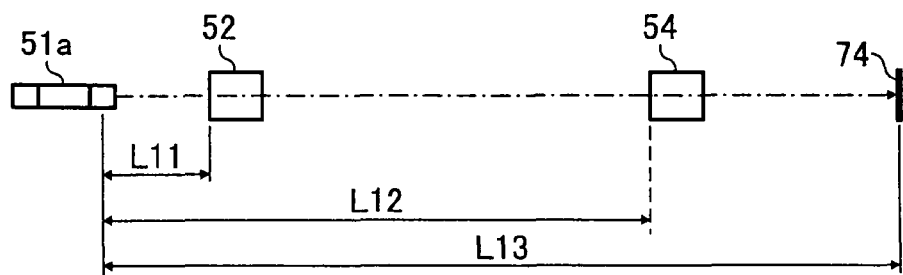
FIG. 9C is a simplified schematic diagram for explaining an optical path of the optical scanning device according the third embodiment.

In the same manner as the above example, the optical scanning devices 5, 25, and 75 respectively have a different configuration (overall shape) from one another. FIGS. 9A to 9C are simplified schematic diagrams for explaining an optical path of the optical scanning devices 5, 25, and 75 respectively. As shown in FIGS. 9A, 9B, and 9C, a shape of an optical path extending from the rotational polygon mirror 51a to the surface of the object to be scanned (the photoconductive drum) 4, 24, or 74 is changed depending on the number of the reflection mirrors 53, or with or without the reflection mirror 53.

It is assumed that a distance between the rotational polygon mirror 51a and the fθ lens 52 is referred to as a distance L11, and a distance between the rotational polygon mirror 51a and the toroidal lens 54 is referred to as a distance L12, and then a distance between the rotational polygon mirror 51a and the surface of the object to be scanned (the photoconductive drum) 4, 24, or 74 is referred to as a distance L13. Each of the distances L11, L12, and L13 are identical among the optical scanning devices 5, 25, and 75.

Furthermore, as shown in FIG. 3, it is assumed that a distance between the light source unit 56 and the rotational polygon mirror 51a is referred to as a distance L0, and a distance between the cylindrical lens 57 and the rotational polygon mirror 51a is referred to as a distance L. The distances L0 and L also need be kept constant. According to the first to third embodiments, the first enclosure 61 and optical elements held by the first enclosure 61 are used in common among the optical scanning devices 5, 25, and 75 without any change or modification. Therefore, the distances L0 and L can be kept constant among the optical scanning devices 5, 25, and 75.

In other words, the common used optical elements such as the polygon scanner 51, the fθ lens 52, and the toroidal lens 54 are identical among the optical scanning devices 5, 25, and 75. In addition, both the distances L1, L2, and L3 and the distances L0 and L are identical among the optical scanning devices 5, 25, and 75. Therefore, although the optical scanning devices 5, 25, and 75 respectively have a different configuration from one another, the optical scanning devices 5, 25, and 75 have the same optical performance. Thus, the optical scanning devices 5, 25, and 75 can achieve the desired imaging performance.

Furthermore, the first enclosure 61 and the optical elements held by the first enclosure 61 can be used in common among the optical scanning devices 5, 25, and 75 without any change or modification. Therefore, it is possible to reduce production costs of the optical scanning devices 5, 25, and 75. Moreover, parts of the optical scanning devices 5, 25, and 75 or the optical scanning devices themselves can effectively be reused or recycled.

Furthermore, in the optical scanning devices 5, 25, and 75, each of the second enclosures 62, 62B, and 62C is fixed to the first enclosure 61 in the same fixing position (position of a fixing member) by the same fixing method. Therefore, the first enclosure 61 can be selectively attached to any of the second enclosures 62, 62B, and 62C. Moreover, optical elements held by the second enclosure 62, 62B, or 62C, such as the toroidal lens 54 and the reflection mirror 53, and optical elements held by the first enclosure 61, such as the polygon scanner 51 and the fθ lens 52, are arranged to be able to achieve the desired imaging performance (see FIGS. 9A, 9B, and 9C). Therefore, it is possible to provide various types of optical scanning devices applicable to various types of image forming apparatuses having a different configuration easily.

Furthermore, in the optical scanning devices 5, 25, and 75, the covers 65, 65B, and 65C respectively have a different shape, and materials of the covers 65, 65B, and 65C are not defined to be identical to one another. Therefore, if fixing/coupling members has a different material and a different shape from one another, the rate of expansion or shrinkage of each of the members are also different. With temperature variation, it may cause a distortion in the shape of each of the members depending on how tight the member is fixed. Consequently, it is necessary to pay attention to the temperature variation of the periphery of the optical scanning device, and the temperature variation of the first enclosure 61, which is caused by a rotation of the polygon scanner 51. To avoid the above burden, a fixed portion is partially to be loosely fixed as shown in FIG. 10.

Figure 10:
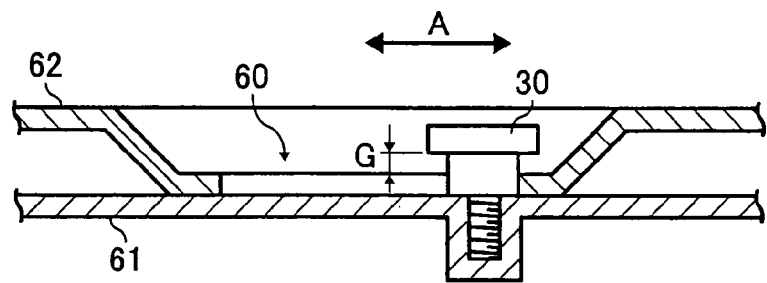
FIG. 10 is a side view of a fixed portion in the optical scanning device for explaining a loose fitting.
Figure 11:
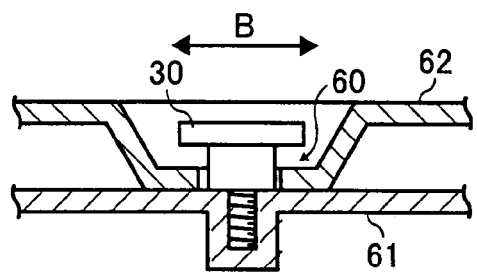
FIG. 11 is a side view of the fixed portion viewed in a direction perpendicular to an arrow A shown in FIG. 10.

As shown in FIG. 10, when the second enclosure 62 is fixed to the first enclosure 61, the first enclosure 61 and the second enclosure 62 are overlapped with each other, and fixed by a shoulder screw 30. In this time, a gap G between an undersurface of a head of the shoulder screw 30 and a member subjected to be fixed (the second enclosure 62) is minimized, and thereby absorbing a difference between expansion/shrinkage levels of the first enclosure 61 and the second enclosure 62. A position of a hole 60 (a guide groove in which a body portion of the shoulder screw 30 is inserted) is appropriately set (in either direction indicated by an arrow A) based on the expansion/shrinkage levels of the first enclosure 61 and the second enclosure 62. FIG. 11 is a side view of the fixed portion viewed in a direction perpendicular to the arrow A shown in FIG. 10. In this direction, it is not necessary to consider the difference between the expansion/shrinkage levels of the first enclosure 61 and the second enclosure 62, so that there is little gap between the hole 60 and the shoulder screw 30.

The loose fixing as shown in FIG. 10 can be used not only to fix between the first and second enclosures, but also to fix the cover 65 to the first and second enclosures, and to fix the entire optical scanning device to a main frame of the image forming apparatus (not shown). The loose fixing can be selectively used depending on a difference between expansion/shrinkage levels of members to be fixed.

For example, the cover 65 can be loosely fixed to either one of the first enclosure 61 or the second enclosure 62 (and firmly fixed to the other enclosure), or can be loosely fixed to both of the first enclosure 61 and the second enclosure 62.

Also, either one of the first enclosure 61 or the second enclosure 62 can be firmly fixed to the frame of the image forming apparatus, and the other enclosure can be loosely fixed to the frame of the image forming apparatus. In this case, the cover 65 can be firmly fixed to one of the enclosures that is firmly fixed to the frame of the image forming apparatus (and loosely fixed to the other enclosure).

Incidentally, in the optical scanning devices 5, 25, and 75, the fθ lens 52, which is included in (the optical elements located on the downstream side of the rotational polygon mirror 51a of) the second optical system, is located relatively close to the polygon scanner 51 (i.e., the distance L11 is small), so that the fθ lens 52 is fixed to the first enclosure 61.

In a case of an optical system in which the fθ lens 52 is located far from the polygon scanner 51 (i.e., a difference between the distances L11 and L12 is small), the fθ lens 52 can be fixed to the second enclosure instead of the first enclosure. In this case, another enclosure capable of including the whole second optical system (an enclosure having an optical path corresponding to a layout of the image forming apparatus) is prepared as the second enclosure, and an appropriate one of the second enclosures is selectively used (by combining with the first enclosure).

Figure 12:
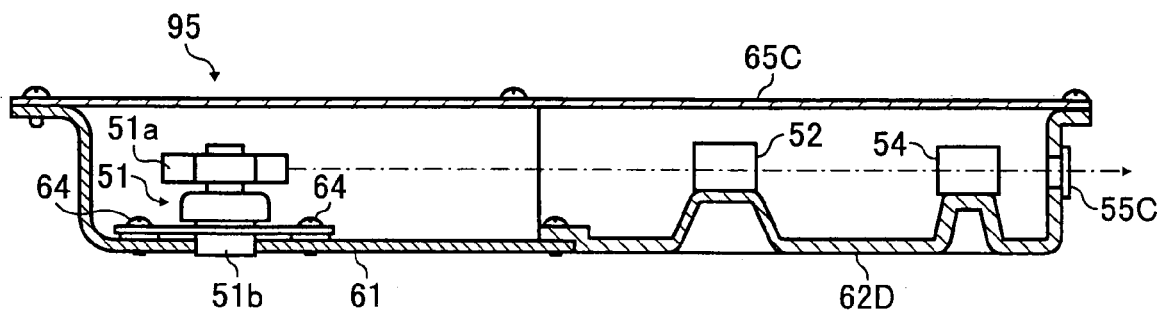
FIG. 12 is a side view of an optical scanning device in which an fθ lens is fixed to a second enclosure.
Figure 13:
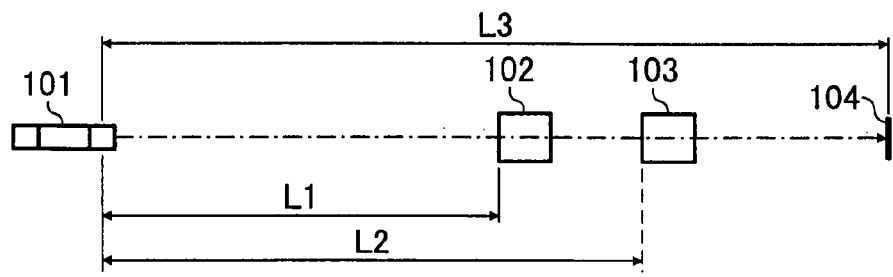
FIG. 13 is a simplified schematic diagram for explaining a layout of an optical system included in the optical scanning device shown in FIG. 12.

FIG. 12 is a side view of an optical scanning device 95 in which the fθ lens 52 is fixed to a second enclosure 62D (i.e., the whole second optical system is included in the second enclosure 62D). A configuration of the optical scanning device 95 is similar to that is in the optical scanning device 75 according to the third embodiment. FIG. 12 depicts the optical scanning device 95 in a case in which the distance L11 between the rotational polygon mirror 51a and the fθ lens 52 is relatively large. FIG. 13 is a schematic diagram for explaining a layout of an optical system corresponding to the configuration shown in FIG. 12. In the same manner as the optical system shown in FIG. 8, it is assumed that the distance between the reflection surface of the polygon mirror 101 and the first scanning lens (an fθ lens) 102 is referred to as the distance L1, and the distance between the reflection surface of the polygon mirror 101 and the second scanning lens (a toroidal lens) 103 is referred to as the distance L2, and then the distance between the reflection surface of the polygon mirror 101 and the surface of the object 104 is referred to as the distance L3. Incidentally, in this case, the configuration of the optical scanning device is similar to that is in the third embodiment, but it is also applicable to a configuration of an optical scanning device similar to those in the first or second embodiment.

On the contrary, in a case of an optical system in which a difference between the distances L11 and L12 is small and the distance L12 is small, the fθ lens 52 and the toroidal lens 54 can be fixed to the first enclosure. Depending on degrees of the distances L11 and L12, the fθ lens 52 and the toroidal lens 54 can be fixed to either the first enclosure or the second enclosure. Namely, although an example in which the toroidal lens 54 is fixed to the first enclosure is not shown in the drawings, both the fθ lens 52 and the toroidal lens 54 can be fixed to either one of the first enclosure or the second enclosure.

Furthermore, in the above embodiments, the second optical system includes the fθ lens, the toroidal lens, and the reflection mirror only, but optical elements to be included in the second optical system are not limited to the above-mentioned lenses. Any other optical elements such as a curved mirror can be used as the optical elements included in the second optical system. Also, degrees of the distances L11, L12, and L13 can be apparently changed (i.e., the optical path can be extended or shrunk) by adding a flat glass thereto or removing the flat glass therefrom.

The first enclosure (the first enclosure 61 in the embodiments) and the second enclosure (the second enclosures 62, 62B, and 62C in the embodiments), which form the frame of the optical scanning device, can be processed by any processing method depending on shapes, the workability, and the number of the enclosures to be processed. In the embodiments, components to be held by the first enclosure 61 are defined, and also shapes of portions to which the components are fixed are simple. Therefore, as for the first enclosure, it is preferable to process by deformation processing such as press working to reduce the production cost of the first enclosure.

On the other hand, a shape of the second enclosure needs to be changed in accordance with various layouts of optical elements corresponding to layouts of image forming apparatuses. Therefore, a shape of the second enclosure occasionally becomes complicated, such as in the cases of the second enclosures 62 and 62B. In these cases, the second enclosure can easily be processed by a method of dissolving a material, such as by die-casting or by injection molding.

In this manner, the enclosure of the optical scanning device according to the embodiments can be formed by a combination of the first enclosure (the first enclosure 61) that is used in common among various layouts of image forming apparatuses and the second enclosure (the second enclosure 62, 62B, or 62C) that is selectively changed depending on the layouts of the image forming apparatuses. Moreover, optical elements included in each of the first and second enclosures can also be used in common among the various layouts of the image forming apparatuses. Therefore, it is possible to provide the optical scanning device having an appropriate configuration corresponding to any layout of the image forming apparatus with low costs and a simple method. Furthermore, it is possible to achieve a desired imaging performance in any types of the optical scanning devices constant.

In the embodiments, the fθ lens, which is included in the second optical system, is arranged on the first enclosure 61. This is because, out of components to be precisely managed to keep a distance from the rotational deflector constant, components adjacent to the rotational deflector, i.e., components that need to keep not only the distance from the rotational deflector constant but also a relative position from the rotational deflector constant (not to be affected by a reflection and the like) are arranged on the first enclosure to avoid causing any effect on the optical performance as much as possible. As a result, the first enclosure can be used in common among optical scanning devices having different configurations, and it makes possible a simultaneous achievement of common use of elements included in the optical scanning device and the diversification of the optical scanning devices. Furthermore, a complicated shape of, for example, a turn-round portion of the optical path, which is caused by the action of the reflection mirror, can be separated (as the second enclosure) from the first enclosure. Therefore, components of the first enclosure can be processed by press working with low costs, and thus the production costs of the optical scanning device can be reduced.

Furthermore, in a conventional manner, a specification of the optical scanning device can be easily changed by selecting (setting) the number of beams emitted from the light source, and a rotation speed and a rotation direction of the polygon scanner as the rotational deflector. Therefore, it is possible to provide more various types of optical scanning devices.

Figure 14:
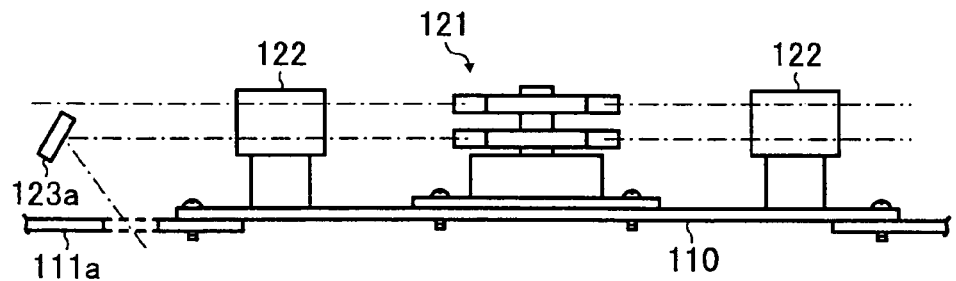
FIG. 14 is a schematic diagram for explaining an example of an optical scanning device included in a tandem type of a color-image forming apparatus according to a conventional technology.
Figure 15:
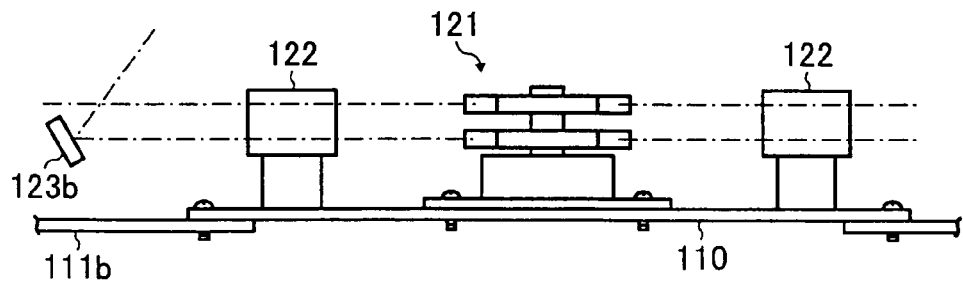
FIG. 15 is a schematic diagram for explaining another example of an optical scanning device included in a tandem type of a color-image forming apparatus according to a conventional technology.
Figure 16A:
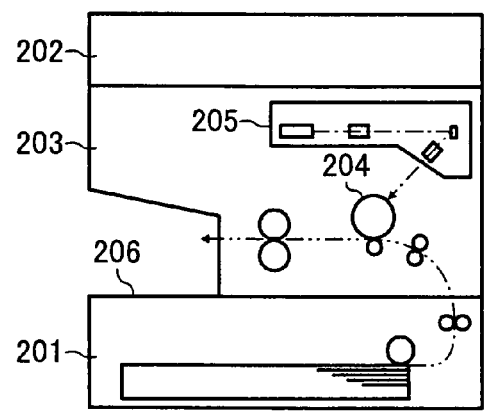
FIG. 16A is a side view of a digital copying machine as an example of an image forming apparatus equipped with an optical scanning device according a conventional technology.
Figure 16B:
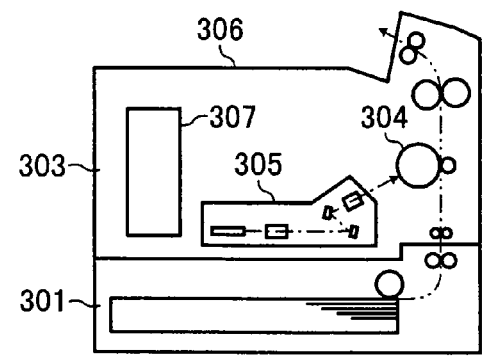
FIG. 16B is a side view of a laser printer as an example of an image forming apparatus equipped with an optical scanning device according the conventional technology.
Figure 16C:
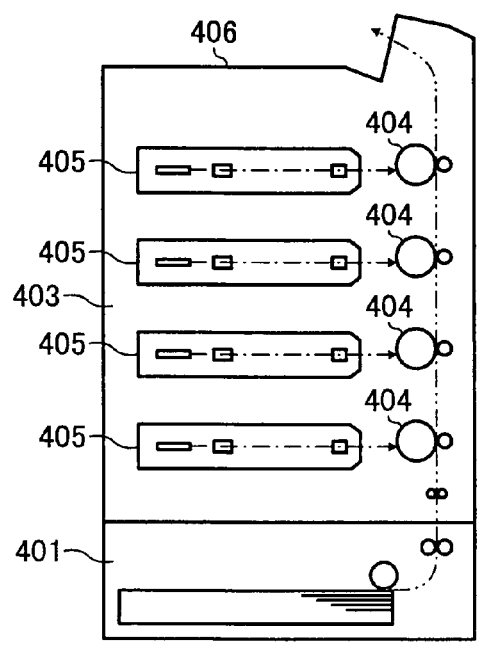
FIG. 16C is a side view of a full-color printer as an example of an image forming apparatus equipped with an optical scanning device according the conventional technology.

The above configuration of the optical scanning device can be applied to an optical scanning device used in a tandem type of a color-image forming apparatus as disclosed in Japanese Patent No. 3862950 and Japanese Patent Application Laid-Open No. 2004-354848, which are applied separately by the present applicant. The optical scanning device used in the color-image forming apparatus disclosed in Japanese Patent No. 3862950 employs a configuration shown in FIG. 14, and the optical scanning device used in the color-image forming apparatus disclosed in Japanese Patent Application Laid-Open No. 2004-354848 employs a configuration shown in FIG. 15. As shown in FIGS. 14 and 15, a first enclosure and components fixed to the first enclosure are used in common between the optical scanning devices.

In the optical scanning devices shown in FIGS. 14 and 15, a polygon scanner 121 and two fθ lenses 122 are fixed to a first enclosure 110. Lights emitted from four light source units (not shown) are deflected by a two-stage polygon mirror included in the polygon scanner 121, and led to a reflection mirror 123a or 123b, which is fixed to a second enclosure 111a or 111b. Other optical elements and optical paths included in the optical scanning device are identical to those disclosed in Japanese Patent No. 3862950 and Japanese Patent Application Laid-Open No. 2004-354848, and the description of those portions, which are not shown in FIGS. 14 and 15, is omitted.

The embodiments of the present invention are explained in detail above with reference to the accompanying drawings, but the present invention is not limited to the embodiments. For example, a setting of the optical path in the optical scanning device can be changed depending on a layout of an image forming apparatus equipped with the optical scanning device. Also, it is possible to change settings of layouts of optical elements, with or without the reflection mirror, the number of the reflection mirrors, and the like accordingly. Moreover, shapes of the first and second enclosures can be changed, and a setting of optical elements included in each of the first and second enclosures can be changed. Furthermore, settings of the distances L1 to L3, L11 to L13, L, and L0 can be changed.

Furthermore, settings of the number of beams emitted from the light source, and a rotation speed and a rotation direction of the polygon scanner as the rotational deflector can be changed. Therefore, it is possible to provide various types of the optical scanning devices. In addition, the optical scanning device according to the present invention can be applied to a multi-beam optical scanning device.

A configuration of the image forming apparatus equipped with the optical scanning device can also be changed. The image forming apparatus can employ any other transfer method such as an intermediate transfer method. As for units included in the image forming apparatus, such as the developing device and the fixing device, any kinds of devices can be used. The image forming apparatus according to the present invention is not limited to just a copying machine and a printer, but includes a facsimile machine, a multifunction product, and the like.

As described above, according to one aspect of the present invention, it makes possible to achieve both common use of elements of the optical scanning device and the diversification of the optical scanning devices. Moreover, it makes possible to provide the optical scanning device in accordance with various layouts of the image forming apparatuses with low costs and a simple method. Furthermore, any configuration of the optical scanning devices can achieve a desired imaging performance constant.

In addition, a complicated shape of, for example, a turn-round portion of the optical path can be separated (as the second enclosure) from the first enclosure. Therefore, it is possible to reduce not only the production cost of the first enclosure but also the production costs of the entire optical scanning device and the image forming apparatus.

Furthermore, according to another aspect of the present invention, optical elements to be precisely laid out are partially held by the enclosure to avoid causing any effect on the optical performance as much as possible. Thus, it is possible to achieve both the common use of elements included in the optical scanning device and the diversification of the optical scanning devices.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device, comprising:
   an optical housing divided into two parts, a first housing and a second housing;
   a light source that emits a light;
   a deflector that deflects the light emitted from the light source;
   an fθ lens mainly used to focus an image in a main scanning direction;
   a reflection mirror;
   a toroidal lens;
   a first optical system, which includes the light source and the deflector, configured to lead the light emitted from the light source to the deflector; and
   a second optical system, which includes the reflection mirror and the toroidal lens as optical elements, configured to lead the light deflected by the deflector onto a surface to be scanned;
   wherein the first housing is configured to house the first optical system and the fθ lens, and
   wherein the second housing is configured to house at least one optical element included in the second optical system.

2. The optical scanning device of claim 1, wherein the first housing holds the light source, the deflector, the first optical system, and at least one optical element from among optical elements included in the second optical system located closest to the deflector, and
   wherein the second housing holds a rest of the optical elements included in the second optical system other than the at least one optical element held by the first housing.

3. The optical scanning device of claim 1, wherein the first housing is configured to be combined with another second housing that has an optical path different from that of the second housing.

4. The optical scanning device of claim 1, wherein a plurality of another second housings are provided, each of the another second housings having an optical path different from that of the second housing, and
   wherein the first housing is configured to be selectively combined with one of the another second enclosure housings.

5. The optical scanning device of claim 1, wherein the first housing is made of a steel sheet by deformation processing, and
   wherein the second housing is molded by melting processing.

6. The optical scanning device of claim 5, wherein the first housing is formed by press processing.

7. The optical scanning device of claim 5, wherein the second housing is formed by injection molding.

8. The optical scanning device of claim 5, wherein the second housing is formed by die-casting.

9. The optical scanning device of claim 1, wherein a plurality of first optical systems and a plurality of second optical systems are provided, and wherein each of the first optical systems and the second optical systems scans a different portion of the surface to be scanned.

10. The optical scanning device of claim 1, further comprising;
a cover that covers both the first housing and the second housing.

11. The optical scanning device of claim 10, wherein the cover is loosely fixed to at least one of the first housing and the second housing.

12. An image forming apparatus comprising an optical scanning device, wherein the optical scanning device includes:
an optical housing divided into two parts, a first housing and a second housing;
a light source that emits a light;
a deflector that deflects the light emitted from the light source;
an fθ lens mainly used to focus an image in a main scanning direction;
a reflection mirror;
a toroidal lens;
a first optical system, which includes the light source and the deflector, configured to lead the light emitted from the light source to the deflector; and
a second optical system, which includes at least one optical the reflection mirror and the toroidal lens as optical elements, configured to lead the light deflected by the deflector onto a surface to be scanned;
wherein the first housing is configured to house the first optical system and the fθ lens, and
wherein the second housing is configured to house at least one optical element included in the second optical system.

13. The image forming apparatus of claim 12, wherein one of the first housing and the second housing is fixed to a frame of the image forming apparatus, and
wherein the other of the first housing and the second housing is loosely fixed to the frame.

14. The image forming apparatus of claim 13, wherein the optical scanning device further includes a cover that covers both the first housing and the second housing,
wherein the one of the first housing and the second housing, which is fixed to the frame, is further fixed to the cover, and
wherein the other of the first housing and the second housing, which is loosely fixed to the frame, is loosely fixed to the cover.

15. A method of configuring an optical scanning device that includes an optical housing including a first housing and a second housing, a light source that emits a light, a deflector that deflects the light emitted from the light source, a first optical system configured to lead the light emitted from the light source to the deflector, and a plurality of second optical systems each including at least one optical element, having a different optical path, configured to lead the light deflected by the deflector onto a surface to be scanned, the method comprising:
causing the first housing to hold the light source, the deflector, and the first optical system;
causing the second housing to hold optical elements for the optical scanning device other than those held by the first housing; and
combining selectively the first housing with another second housing from among a plurality of another second housings.

16. The method of claim 15, wherein a light source of a different number of beams is selectively used as the light source.

17. The method of claim 15, wherein a deflector having a rotational polygon mirror with a different rotation speed is selectively used as the deflector.

18. The method of claim 15, wherein a deflector having a rotational polygon mirror with a different rotation direction is selectively used as the deflector.

* * * * *